United States Patent
Hong (10) Patent No.: US 9,594,529 B2
(45) Date of Patent: Mar. 14, 2017

(54) METHODS AND APPARATUS TO SELECT A PAPER SOURCE FOR IMAGE PRINTING

(75) Inventor: Jiang Hong, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 252 days.

(21) Appl. No.: 12/640,809

(22) Filed: Dec. 17, 2009

(65) Prior Publication Data
US 2011/0149333 A1   Jun. 23, 2011

(51) Int. Cl.
*G06F 15/00*   (2006.01)
*G06F 3/12*    (2006.01)

(52) U.S. Cl.
CPC .......... *G06F 3/1208* (2013.01); *G06F 3/1204* (2013.01); *G06F 3/1232* (2013.01); *G06F 3/1247* (2013.01); *G06F 3/1271* (2013.01); *G06F 3/1287* (2013.01); *G06F 3/122* (2013.01)

(58) Field of Classification Search
CPC .................................................... G06F 3/1208
USPC ........................................................ 358/1.15
See application file for complete search history.

(56) References Cited

U.S. PATENT DOCUMENTS

| | | | |
|---|---|---|---|
| 6,285,842 B1* | 9/2001 | Katamoto | H04N 1/00352 399/14 |
| 6,628,417 B1* | 9/2003 | Naito et al. | 358/1.15 |
| 7,124,094 B1* | 10/2006 | Kobayashi et al. | 705/64 |
| 2007/0109575 A1* | 5/2007 | Salgado et al. | 358/1.13 |
| 2010/0165386 A1* | 7/2010 | Kusunoki | 358/1.15 |

FOREIGN PATENT DOCUMENTS

| | | |
|---|---|---|
| JP | H11149358 A | 6/1999 |
| JP | 2000198248 A | 7/2000 |
| JP | 2004338189 A | 12/2004 |
| JP | 2008265205 A | 11/2008 |

OTHER PUBLICATIONS

Machine translation of Japanese Patent Document No. 2010-149393, Kusunoki, Dec. 25, 2008.*

* cited by examiner

*Primary Examiner* — Mark Milia
(74) *Attorney, Agent, or Firm* — Duft Bornsen & Fettig LLP (57) ABSTRACT

Methods and apparatus for selecting a paper source for image printing are provided. A user accesses a service available from a print server for printing an image. The print server may download the image from a storage server over a network. The print server automatically identifies a list of paper sizes corresponding with a list of available paper sources, and selects a scaling ratio for fitting the image into one of the paper sizes. The print server generates a scaled image based on the selected scaling ratio and sends the scaled image to a printer for the scaled to be printed from a selected paper source.

20 Claims, 5 Drawing Sheets

METHODS AND APPARATUS TO SELECT A PAPER SOURCE FOR IMAGE PRINTING

BACKGROUND

1. Field of the Invention

The invention relates generally to image printing and more specifically relates to image printing with cloud storage.

2. Discussion of Related Art

"Cloud computing" generally encompasses processing and/or storage of data based on the Internet. For example, cloud computing may encompass the concepts of Software as a Service ("SaaS") and cloud storage. SaaS provides an application as a service for a customer to use on demand. Meanwhile, "cloud storage" generally encompasses the concept of providing/delivering data storage as a service, with the customer being billed for the amount of storage usage under a utility computing model (similar to traditional public utilities including electricity).

As presently practiced, a user is able to store images at a cloud storage, and retrieve an image from the cloud storage to a local computer for printing. To print the image, the user typically interacts with a print driver running on the local computer to select a paper size and/or paper source. The print driver then processes the image and instructs the printer to print the processed image using paper from the selected paper source or paper tray.

However, image sizes vary widely, and it is typically guesswork to select the appropriate paper source. A process of trial and error eventually results in the image being printed on the appropriate paper, but often paper is wasted. Further, a poor choice of paper size may result in undesirable modifications to the image. For example, cropping, enlarging, and/or reducing the image more than needed may result in unexpected poor image quality. All of the local computer, printer driver, and the printer also need to be operational in order to print the image. Moreover, because a number of networked printers may be available to the local computer, the user may accidentally select a wrong printer and/or may not know the actual location of a selected printer. The present techniques thus impose a number of burdens on users who wish to print an image from the cloud storage.

There is thus a need for methods and apparatus to select a paper source for image printing in cloud computing

SUMMARY

The present invention solves the above and other problems, thereby advancing the state of the useful arts, by providing methods and apparatus to automatically select a paper source for image printing. Rather than using a local computer, a user accesses a service available from a print server for printing an image. The print server automatically identifies a list of paper sizes corresponding with a list of available paper sources. The print server also automatically identifies an image size of the image. The print server then determines whether the image size fits into any of the list of paper sizes without scaling. If not, the print server selects a scaling ratio and generates a scaled image based on the image and the selected scaling ratio. The print server also selects a paper source based on the selected scaling ratio, and sends the scaled image to a printer for the scaled image to be printed using paper from the selected paper source.

In one embodiment, a method is operable in a print server to select a paper source for printing an image. The method includes identifying a list of paper sizes corresponding with a list of available paper sources for image printing, and identifying an image size of the image. The method also includes determining whether the image size fits into any of the list of paper sizes without scaling. Responsive to a determination that the image size does not fit into any of the list of paper sizes without scaling, the method includes performing the following steps. The method includes identifying a list of scaling ratios for fitting the image size into each of the list of paper sizes. The method also includes selecting a scaling ratio from the list of scaling ratios such that the image size is reduced the least by applying the selected scaling ratio. Additionally, the method includes generating a scaled image based on the image and the selected scaling ratio, and selecting a paper source based on the selected scaling ratio. Moreover, the method includes sending the scaled image from the print server to a printer for the scaled image to be printed using paper from the selected paper source.

In another embodiment, a system is provided to select a paper source for printing an image. The system includes an interface operable to identify a list of paper sizes corresponding with a list of available paper sources for image printing, and operable to identify an image size of the image. The system also includes a controller operable to determine whether the image size fits into any of the list of paper sizes without scaling; and operable, responsive to a determination that the image size does not fit into any of the list of paper sizes without scaling, to identify a list of scaling ratios for fitting the image size into each of the list of paper sizes, to select a scaling ratio from the list of scaling ratios such that the image size is reduced the least by applying the selected scaling ratio, to generate a scaled image based on the image and the selected scaling ratio, to select a paper source based on the selected scaling ratio, and to send the scaled image from the print server to a printer for the scaled image to be printed using paper from the selected paper source.

In yet another embodiment, a method is operable in a printer to select a paper source for printing an image. The method includes sending, from the printer to a print server, a list of paper sizes corresponding with a list of available paper sources for image printing. The method also includes sending, from the printer to the print server, an identification of the image. Additionally, the method includes receiving, from the print server, a scaled image generated by the print server based on the image and a scaling ratio for printing the image on paper from a paper source, the paper source being selected by the print server from the list of available paper sources. Moreover, the method includes printing the scaled image using paper from the paper source.

BRIEF DESCRIPTION OF THE DRAWINGS

The same reference number represents the same element or same type of element on all drawings.

DETAILED DESCRIPTION OF THE DRAWINGS

FIGS. 1 through 5 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
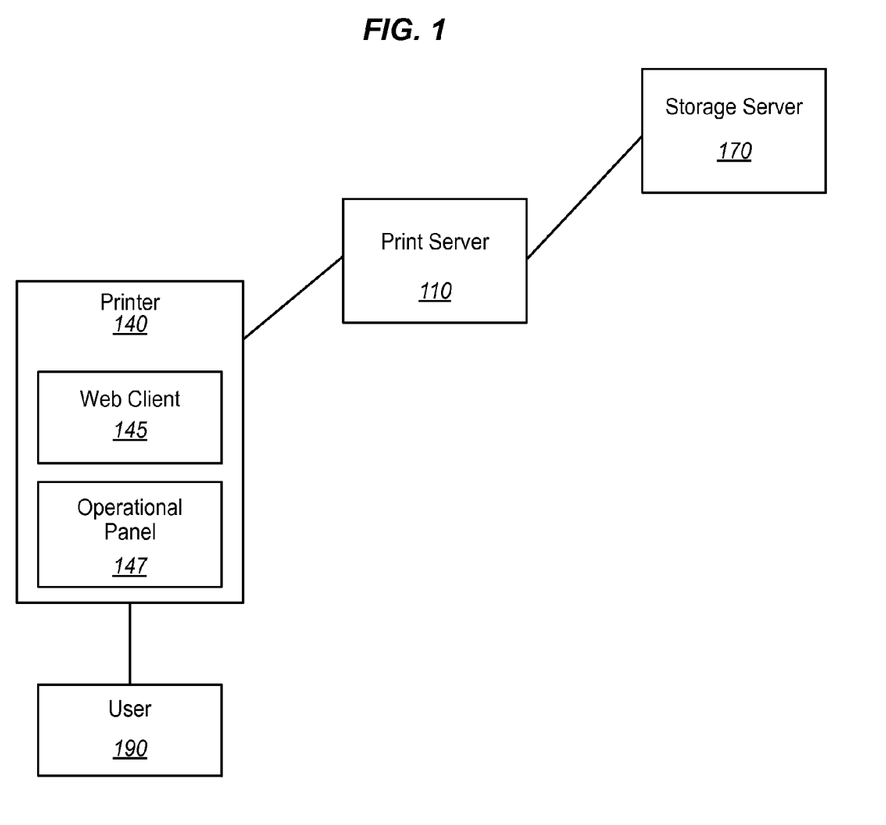
FIG. 1 is a block diagram of an exemplary system to select a paper source for image printing.

FIG. 1 is a block diagram of an exemplary system to select a paper source for image printing. A print server 110 is in communication with a storage server 170 and a printer 140. The print server 110 may comprise any server capable of providing Software as a Service. For example, image printing may be provided by a service provider as a service that a customer subscribes to. The storage server 170 may comprise any server capable of providing storage for images. For example, the storage server 170 may comprise part of a cloud storage provided through the Internet. Exemplary cloud storage providers include Amazon S3, Nirvanix, and DocumentMall. The storage server 170 may also comprise part of a photo sharing website including Picasa Web Albums. In another embodiment, the storage server 170 may comprise a storage server that the print server 110 accesses over a network. The storage server may comprise any computing device that can provide storage, and the network may comprise the Internet, a local area network, and/or a storage network. For example, the storage server may comprise a network-attached storage ("NAS") unit and/or a storage area network ("SAN") unit.

The printer 140 may comprise any printer capable of communicating with the print server 110. For example, the printer 140 may comprise a web client 145 that allows a user 190 to access the image printing service provided by the print server 110. The web client 145 may comprise a web browser including Internet Explorer, Firefox, or Opera, among others. The user 190 may interact with the web client 145 through an operational panel 147 of the printer 140. The operational panel 147 may comprise any device operable to display information for a user and/or to receive input from the user. For example, the operational panel 147 may comprise an LCD display, a keypad, and/or a touchscreen. The printer 140 may comprise a standalone printer or part of a MFP. It is noted that the word "MFP" may be read as multi-function peripheral, multi-function printer, or multi-function product. Because the user 190 is able to access the image printing service directly from the printer 140, the user 190 does not need to use a local computer and would not accidentally select a wrong printer at the local computer.

One skilled in the art will recognize that FIG. 1 is illustrative in nature, and that specific blocks or modules depicted in FIG. 1 may be grouped in fewer or more exemplary modules as a matter of design choice. Additionally, one skilled in the art will recognize that any specific blocks may comprise any number of circuits, processors, memory systems (both persistent and volatile), programmable devices, hard disks, flash based persistent storage, battery backed up random access memory (RAM), or any other system or apparatus operable to perform the functionality recited herein with respect to FIG. 1.

Figure 2:
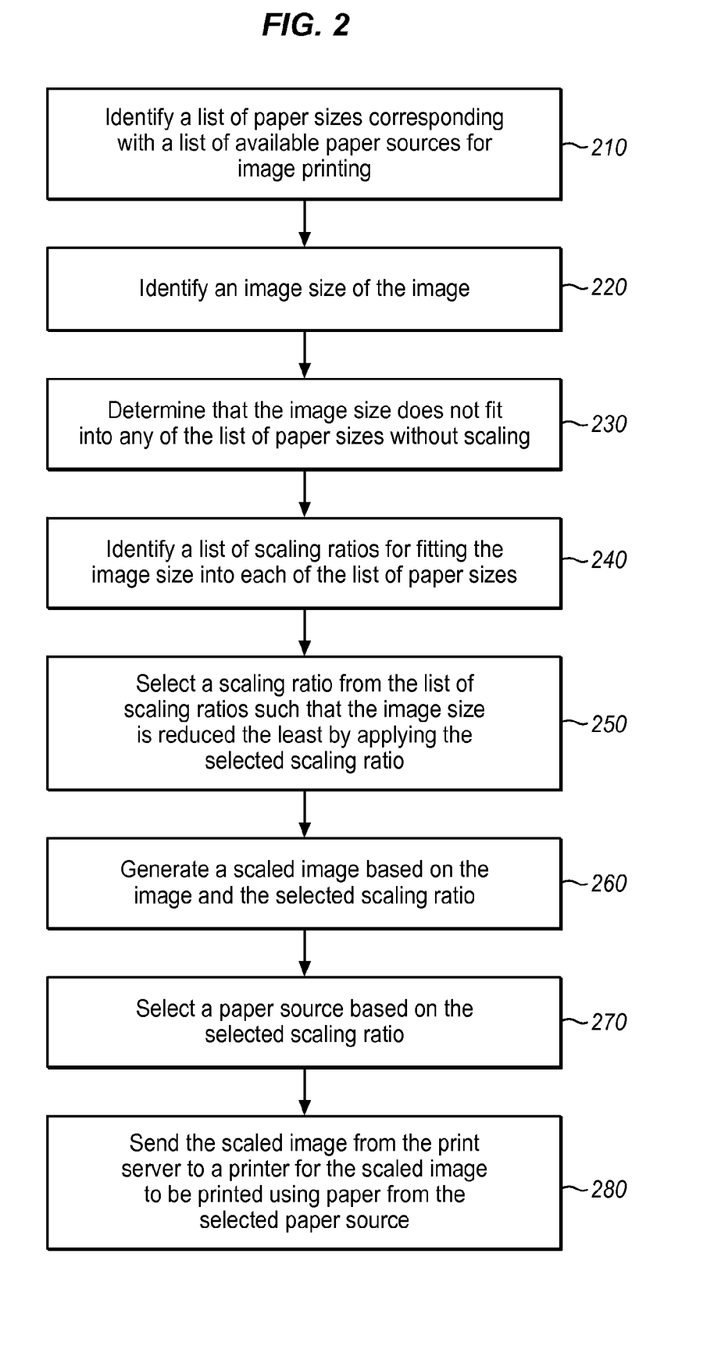
FIGS. 2 and 3 are flowcharts describing exemplary methods to select a paper source for image printing.
Figure 3:
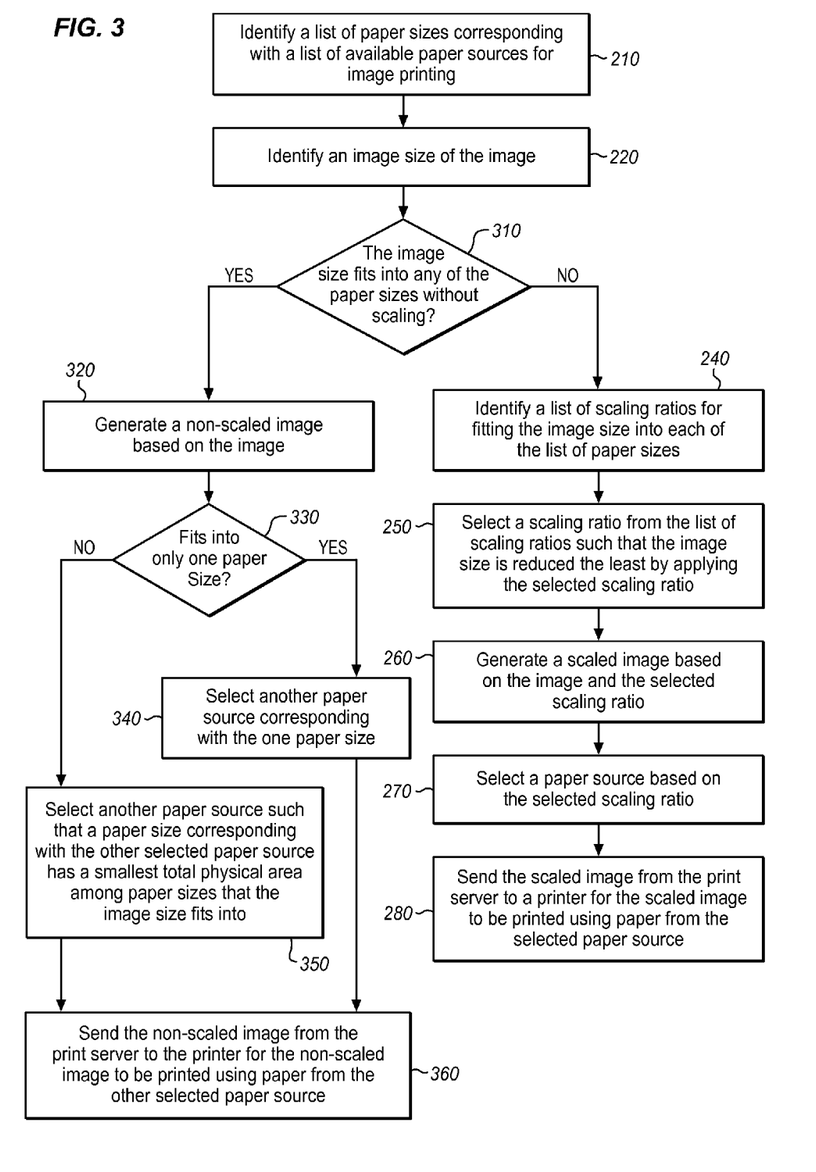

FIGS. 2 and 3 are flowcharts describing exemplary methods to select a paper source for image printing. The method described herein may be operable in, for example, the system of FIG. 1. It is assumed that a user has interacted with a web client at a printer and that the web client has accessed the image printing service provided at a print server. The print server is operable to provide the image printing service with methods that comprise the following steps.

FIG. 2 illustrates a high level flowchart describing an exemplary method. At step 210, the print server identifies a list of paper sizes corresponding with a list of available paper sources for image printing. The list of available paper sources may correspond with paper trays of the printer. For example, the printer may have two paper trays in an embodiment. A first paper tray may hold paper with a paper size of 8.5×11 inches, and a second paper tray may hold paper with a paper size of 11×17 inches. The print server may receive the list of two paper sizes 8.5×11 inches and 11×17 inches from the printer, with the list of paper sizes corresponding with the two paper sources. The print server may identify the list of paper sizes by querying the printer, and/or the printer may send the list of paper sizes to the print server as part of an image printing request.

At step 220, the print server identifies an image size of the image. It is assumed that the user has identified the image that is to be printed. The print server may identify the image size based on information in an image file of the image. For example, the image file may be in an image format including JPG, BMP, GIF, TIFF, PDF, etc. The image file may have information about the image size in a header of the image file in accordance with its image format.

At step 230, the print server determines that the image size does not fit into any of the list of paper sizes without scaling. For example, the image size information may indicate that the image is 3000×4000 pixels. The image size information (e.g., in the image file) and/or user input may indicate that the image is to be printed at 100 dots per inch ("dpi"). The image size is thus 30×40 inches. If this image size is not scaled by changing its size, it cannot fit into any of the list of paper sizes of 8.5×11 inches and 11×17 inches.

At step 240, the print server identifies a list of scaling ratios for fitting the image size into each of the list of paper sizes. For example, the list of scaling ratios would have two scaling ratios. A first scaling ratio to fit 30×40 into 8.5×11 would be approximately 11:40, and a second scaling ratio to fit 30×40 into 11×17 would be approximately 11:30.

At step 250, the print server selects a scaling ratio from the list of scaling ratios such that the image size is reduced the least by applying the selected scaling ratio. For example, the image would be reduced the least by applying the 11:30 scaling ratio. By applying the 11:40 scaling ratio, the 30×40 image would become 8.3×11, and by applying the 11:30 scaling ratio, the 30×40 image would become 11×14.7. It is noted that 11/30 is greater than 11/40, and the greater (or greatest) value means lesser (or least) reduction in image size.

At step 260, the print server generates a scaled image based on the image and the selected scaling ratio. For example, the print server may use any of a number of known techniques to scale the image including interpolation and/or elimination of pixels. The scaled image would be generated to have an image size of 11:14.7 inches (at 100 dpi) and/or 1100×1466 pixels based on the selected 11:30 scaling ratio. The scaled image may be generated in an image format including JPG, BMP, GIF, TIFF, PDF, etc.

At step 270, the print server selects a paper source based on the selected scaling ratio. For example, the selected scaling ratio of 11:30 corresponds with the 11×17 inches paper size for paper from the second paper tray. The print server would select the second paper tray as the selected paper source. It is noted that if multiple paper sources correspond with the same scaling ratio, the print server may select a paper size that has a smallest total physical area. For example, suppose paper size of the two paper sources are 14×17 inches and 15×17 inches instead. Both 14×17 inches and 15×17 inches correspond with the same scaling ratio of 17:40 (the original 30×40 inches image size would become 12.8×17 inches after applying the 17:40 scaling ratio). The print server may select the 14×17 inches paper source because it has the smallest total physical area.

At step 280, the print server sends the scaled image from the print server to a printer for the scaled image to be printed using paper from the selected paper source. For example, the printer may pull or download the scaled image to the printer using any well know protocols including HTTP. The print server may also send information about the selected paper source to the printer in a separate message to the printer. The printer then prints the scaled image using paper from the selected paper source.

FIG. 3 illustrates a detail level flowchart describing another exemplary method. At step 210 (as described above), the print server identifies a list of paper sizes corresponding with a list of available paper sources for image printing. At step 220 (as described above), the print server identifies an image size of the image. At step 310, the print server identifies whether the image size fits into any of the paper sizes without scaling. If not, the print server proceeds with step 240 to step 280 described above.

If the image size fits into any of the paper sizes without scaling, the print server generates a non-scaled image based on the image at step 320. This step is optional if the original image is already in an image format that can be sent directly to the printer for printing. In another embodiment, the non-scaled image and the original image may be in different image formats. For example, the non-scaled image may be a PDF file, while the original image may be a JPG file.

At step 330, the print server identifies whether the image size fits into only one paper size without scaling the image size. For example, suppose the image size of another image is 900×1200 pixels. At 100 dpi, the image size is 9×12 inches. The list of paper sizes still includes 8.5×11 inches and 11×17 inches. The image size of 9×12 inches only fits into the 11×17 inches paper size without scaling the image size of 9×12 inches. The print server at step 340 selects the paper source that corresponds with the one paper size without needing to scale the image size. In this example, the print server would select the second tray as the paper source, which corresponds with the 11×17 inches paper size.

Suppose the image size of yet another image is 800×1000 pixels. At 100 dpi, the image size is 8×10 inches. The image size of 8×10 inches fits into both the 8.5×11 inches and 11×17 inches paper sizes. When the image size fits into more than one paper size, the print server at step 350 may select a paper size that has a smallest total physical area. For example, the 8.5×11 inches paper size has the smallest total physical area, and the print server selects the first tray as the paper source, which corresponds with the 8.5×11 inches paper size.

At step 360, the print server sends the non-scaled image from the print server to the printer for the non-scaled image to be printed using paper from the other selected paper source. The details of this step are similar to step 280 for sending the scaled image.

Figure 4:
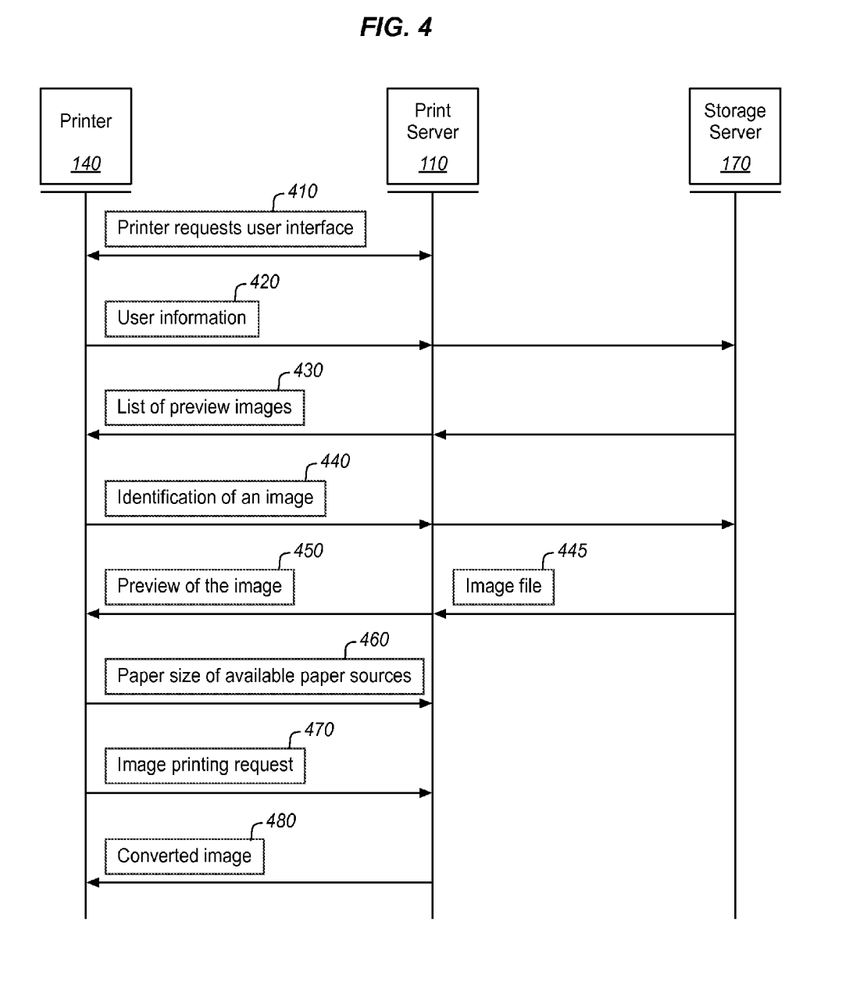
FIG. 4 is an exemplary message flow diagram to select a paper source for image printing.

FIG. 4 is an exemplary message flow diagram to select a paper source for image printing. Components as exemplified in FIG. 1 that initiate and receive messages are depicted at the top of the diagram. An arrow pointing from entity A to entity B generally denotes a message being sent from entity A to entity B. At flow 410, the printer 140 requests a user interface from the print server 110. For example, by default at start up and/or by user request, the web client 145 running on the printer may requests a web page from the print server 110.

At flow 420, the printer 140 sends user information to the print server 110. For example, the user may enter user information to use the image printing service provided by the print server 110, and/or user information to access the user's images stored at the storage server 170. The user may enter this user information into the user interface that is displayed by the web client 145. The print server 110 may send this user information to the storage server 170 to identify a list of images that belong to the user.

At flow 430, the print server 110 receives a list of preview images based on the list of images that belong to the user from the storage server 170. For example, the print server 110 may receive a list of addresses to download the preview images, and the print server 110 downloads the preview images (each may be a thumbnail size image) from the storage server 170. The print server 110 in turn generates a web page that allows the user to see the list of preview images. For example, the web client 145 running at the printer 140 may receive a web page with a list of albums. If the user selects an album, the web client 145 retrieves another web page from the print server 110 that includes a list of preview images in the album.

At flow 440, the printer 140 sends an identification of an image to the print server 110. For example, the user may click on a preview image, and the preview image corresponds with an embedded web address. The printer 140 sends the identification of the image as part of accessing the web address. The print server 110 in turn sends the identification of the image to the storage server 170 to retrieve an image file of the image.

At flow 445, the print server 110 receives the image file from the storage server 170, and generates a preview of the image from the image file. It is noted that this preview of the image is larger than a thumbnail size, and may fill up a display area provided by the web client 145. At flow 450, the web client 145 receives the preview of the image. For example, the web client 145 may receive a web page in which the preview of the image is to take up a full page. The web client 145 then retrieves the preview of the image from the print server 110 and displays the web page with the preview of the image in it.

At flow 460, the print server 110 receives a list of paper sizes of available paper sources at the printer 140. For example, the print server 110 may query the printer 140, and the printer 140 sends the list of paper sizes to the print server 110. In one embodiment, the print server 110 may query the printer 140 by causing the printer 140 to execute a JavaScript extension. For example, the JavaScript extension (e.g., a vendor-specific extension named System.MultiFunction.Capability.PrintSetting) may be embedded in a web page that is sent to the printer 140, and the JavaScript extension is executed when the web client 145 at the printer 140 loads the web page.

At flow 470, the print server 140 sends an image printing request to the print server 110. It is noted that in some embodiments, the list of paper sizes may be sent as part of the image printing request rather than querying the printer 140 at flow 460. At flow 480, the printer 140 receives the converted image from the print server 110 to be printed. The converted image which may be scaled or non-scaled, and may be the original image if conversion is not needed.

It is noted that besides the list of paper sizes, the print server 110 may also receive a list of paper orientation information that corresponds with the list of available paper sources. The print server 110 may identify the list of paper orientation information by querying the printer 140, and/or the printer 140 may send the list of paper orientation information to the print server 110 as part of the image printing request. Paper orientation information may indicate whether the paper is fed in portrait mode (short edge leading) or landscape mode (long edge leading). When the print server 110 generates the converted image, the print server 110 may rotate the original information based on one the list of paper orientation information. For example, suppose the image size of another image is 4000×3000 pixels, the image would be rotate to fit the 11×17 inches paper size in portrait mode. Likewise, suppose the 11×17 inches paper size is available in landscape mode, an image having 3000×4000 pixels would also be rotated.

Figure 5:
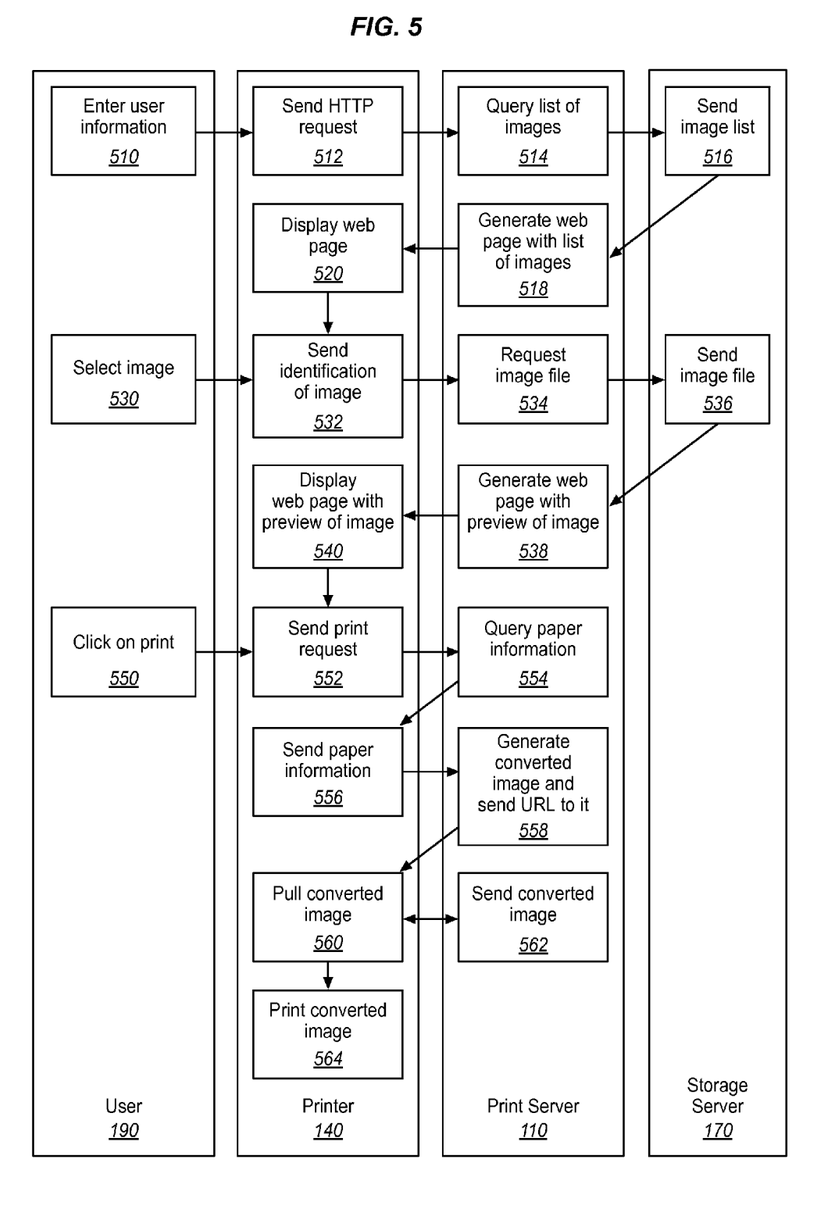
FIG. 5 is a black diagram describing exemplary methods to select a paper source for image printing.

FIG. 5 is a block diagram describing exemplary methods to select a paper source for image printing. The method described herein may be operable in, for example, the system of FIG. 1. In block 510, the user 190 enters user information, for example, at an operational panel of the printer 140, and the user information is received at the printer 140. In block 512, the printer 140 sends the user information in a HTTP request to the print server 110. In block 514, the print server 110 queries the storage server 170 for a list of images associated with the user information. In block 516, the storage server 170 sends the list of images back to the print server 110.

In block 518, the print server 110 generates a web page with the list of images (for example, as thumbnails) for the printer 140. In block 520, the printer 140 receives the web page and displays the web page on an operational panel of the printer 140. In block 530, the user 190 selects one of the images from the list of images. In block 532, the printer sends an identification of the selected image to the print server 110. In block 534, the print server 110 sends a message to the storage server 170 to request an image file of the selected image. The storage server 170 sends the image file to the print server 110 in block 536.

In block 538, the print server 110 generates a web page with a preview of the image for the printer 140. In block 540, the printer 140 displays the web page with the preview of the image. In block 550, the user 190 clicks on the image and confirms that the image is to be printed. In block 552, the printer 140 sends a print request to the print server 110. In block 554, the print server 110 queries paper information (for example, paper size and orientation) of available paper sources from the printer 140.

In block 556, the printer sends the paper information to the print server 110. The print server 110 in block 558 generates a converted image and sends the printer an URL to the converted image. In block 560, the printer 140 pulls the converted image from the print server, and the print server 110 sends the converted image to the printer in block 562. In block 564, the printer prints the converted image using paper from a selected paper source.

Embodiments of the invention can take the form of an entirely hardware (i.e., circuits) embodiment, an entirely software embodiment or an embodiment containing both hardware and software elements. In one embodiment, the invention is implemented in software, which includes but is not limited to firmware, resident software, microcode, etc.

Although specific embodiments were described herein, the scope of the invention is not limited to those specific embodiments. The scope of the invention is defined by the following claims and any equivalents thereof.

I claim:

1. A method operable in a print server to select a paper source for printing an image, the method comprising:
   receiving a print request from a web-enabled printer;
   querying the web-enabled printer for a list of available paper sources at the web-enabled printer for image printing;
   identifying a list of paper sizes corresponding with the list of available paper sources at the web-enabled printer for image printing;
   identifying an image size of the image;
   determining whether the image size fits into any of the list of paper sizes without scaling; and
   responsive to a determination that the image size does not fit into any of the list of paper sizes without scaling, performing the steps of:
      identifying a list of scaling ratios for fitting the image size into each of the list of paper sizes;
      selecting a scaling ratio from the list of scaling ratios such that the image size is reduced the least by applying the selected scaling ratio;
      generating a scaled image based on the image and the selected scaling ratio;
      selecting a paper source from the list of available paper sources at the web-enabled printer based on the selected scaling ratio; and
      sending the scaled image from the print server to the web-enabled printer for the scaled image to be printed using paper from the selected paper source.

2. The method of claim 1, further comprising:
   receiving the image from a storage server.

3. The method of claim 2, further comprising:
   receiving a list of preview images from the storage server;
   sending, from the print server to a web client residing at the web-enabled printer, the list of preview images; and
   receiving an identification of the image from the web client, wherein the image is selected by a user from the list of preview images.

4. The method of claim 3, further comprising:
   receiving, from the web-enabled printer, user information entered by the user; and
   sending, from the print server to the storage server, the user information for receiving the list of preview images associated with the user.

5. The method of claim 2, further comprising:
   sending, from the print server to the web-enabled printer, a query to identify a list of paper orientation information and the list of paper sizes corresponding with the list of available paper sources; and
   receiving, from the web-enabled printer, the list of paper orientation information and the list of paper sizes;
   wherein the step of generating the scaled image further comprises rotating the image based on one of the list of paper orientation information corresponding with the selected paper source.

6. The method of claim 1,
   wherein a plurality of paper sources corresponds with the selected scaling ratio, and
   wherein the step of selecting the paper source comprises selecting the paper source from the plurality of paper sources such that a paper size corresponding with the selected paper source has a smallest total physical area among paper sizes corresponding with the plurality of paper sources.

7. The method of claim 1, further comprising:
responsive to a determination that the image size fits into only one paper size of the list of paper sizes without scaling, performing the steps of:
generating a non-scaled image based on the image;
selecting another paper source corresponding with the one paper size;
sending the non-scaled image from the print server to the web-enabled printer for the non-scaled image to be printed using paper from the other selected paper source.

8. The method of claim 1, further comprising:
responsive to a determination that the image size fits into a plurality of paper sizes from the list of paper sizes without scaling, performing the steps of:
generating a non-scaled image based on the image;
selecting another paper source such that a paper size corresponding with the other selected paper source has a smallest total physical area among the plurality of paper sizes; and
sending the non-scaled image from the print server to the web-enabled printer for the non-scaled image to be printed using paper from the other selected paper source.

9. The method of claim 2, further comprising:
receiving a list of preview images from the storage server;
generating a web page that includes the list of preview images;
sending, from the print server to a web client residing at the web-enabled printer, the web page; and
receiving an identification of the image from the web client, wherein the image is selected by a user from the list of preview images included in the web page.

10. The method of claim 4, further comprising:
receiving a request from the web-enabled printer for a web-based user interface; and
providing the web-based user interface to the web-enabled printer for the user to enter the user information.

11. A print server operable to select a paper source for printing an image, the print server comprising:
an interface operable to receive a print request from a web-enabled printer; and
a controller operable to query the web-enabled printer utilizing the interface for a list of available paper sources at the web-enabled printer for image printing, to identify a list of paper sizes corresponding with the list of available paper sources at the web-enabled printer for image printing, and to identify an image size of the image;
the controller further operable to determine whether the image size fits into any of the list of paper sizes without scaling; and operable, responsive to a determination that the image size does not fit into any of the list of paper sizes without scaling, to identify a list of scaling ratios for fitting the image size into each of the list of paper sizes, to select a scaling ratio from the list of scaling ratios such that the image size is reduced the least by applying the selected scaling ratio, to generate a scaled image based on the image and the selected scaling ratio, to select a paper source from the list of available paper sources at the web-enabled printer based on the selected scaling ratio, and to send the scaled image from the print server to the web-enabled printer for the scaled image to be printed using paper from the selected paper source.

12. The print server of claim 11, wherein the controller is further operable to receive the image from a storage server.

13. The print server of claim 12,
wherein the controller is further operable to receive a list of preview images from the storage server, further operable to send, from the print server to a web client residing at the web-enabled printer, the list of preview images, and further operable to receive an identification of the image from the web client, wherein the image is selected by a user from the list of preview images.

14. The print server of claim 13, wherein the controller is further operable to receive, from the web-enabled printer, user information entered by the user, and further operable to send, from the print server to the storage server, the user information for receiving the list of preview images associated with the user.

15. The print server of claim 12, wherein the controller is further operable to send, from the print server to the web-enabled printer, a query to identify a list of paper orientation information and the list of paper sizes corresponding with the list of available paper sources, further operable to receive, from the web-enabled printer, the list of paper orientation information and the list of paper sizes, and further operable to rotate the image based on one of the list of paper orientation information corresponding with the selected paper source.

16. The print server of claim 11,
wherein a plurality of paper sources corresponds with the selected scaling ratio, and
wherein the controller is further operable to select the paper source from the plurality of paper sources such that a paper size corresponding with the selected paper source has a smallest total physical area among paper sizes corresponding with the plurality of paper sources.

17. The print server of claim 11, wherein the controller is further operable, responsive to a determination that the image size fits into only one paper size of the list of paper sizes without scaling, to generate a non-scaled image based on the image, to select another paper source corresponding with the one paper size, and to send the non-scaled image from the print server to the printer for the non-scaled image to be printed using paper from the other selected paper source.

18. The print server of claim 11, wherein the controller is further operable, responsive to a determination that the image size fits into a plurality of paper sizes from the list of paper sizes without scaling, to generate a non-scaled image based on the image, to select another paper source such that a paper size corresponding with the other selected paper source has a smallest total physical area among paper sizes corresponding with the plurality of paper sizes, and to send the non-scaled image from the print server to the web-enabled printer for the non-scaled image to be printed using paper from the other selected paper source.

19. The print server of claim 12, wherein:
the controller is further operable to receive a list of preview images from the storage server, to generate a web page that includes the list of preview images, to send, from the print server to a web client residing at the web-enabled printer, the web page, and to receive an identification of the image from the web client, wherein the image is selected by a user from the list of preview images included in the web page.

20. The print server of claim 14, wherein:
the controller is further configured to receive a request from the web-enabled printer for a web-based user interface; and the controller is further configured to provide the web-based user interface to the web-enabled printer for the user to enter the user information.

\* \* \* \* \*